United States Patent [19]
Maldini et al.

[11] Patent Number: 5,271,663
[45] Date of Patent: Dec. 21, 1993

[54] WHEEL AND METHOD FOR CORRECTING ROTATIONAL IMBALANCE OF TIRES

[75] Inventors: Henry Maldini, Northridge; Bernard J. O'Neil, Long Beach, both of Calif.

[73] Assignee: Superior Industries International, Inc., Van Nuys, Calif.

[21] Appl. No.: 895,179

[22] Filed: Jun. 5, 1992

Related U.S. Application Data

[63] Continuation of Ser. No. 688,056, Apr. 19, 1991, abandoned.

[51] Int. Cl.⁵ .................................................. B60B 3/02
[52] U.S. Cl. .................................... 301/5.22; 301/63.1; 301/95; 152/154.1
[58] Field of Search ............... 301/69, 95, 5.1, 5.21, 301/5.22, 63.1, 97; 152/154.1

[56] References Cited

U.S. PATENT DOCUMENTS

| | | | |
|---|---|---|---|
| 1,130,210 | 3/1915 | Spence | 301/5 B |
| 1,160,000 | 11/1915 | Schmitt | 301/5B |
| 1,764,076 | 6/1930 | Hayes | 301/5 B |
| 1,811,944 | 6/1931 | Krone | 152/386 X |
| 1,847,774 | 3/1932 | Main et al. | 301/5 B X |
| 1,901,759 | 3/1933 | Maranville | 152/386 X |
| 1,931,649 | 10/1933 | Eger | 301/95 X |
| 2,047,999 | 7/1936 | Eger | 152/379.3 X |
| 2,948,568 | 8/1960 | Hykes et al. | 301/97 X |
| 4,279,287 | 7/1981 | Daudi et al. | 152/375 |
| 4,354,407 | 10/1982 | Daudi et al. | 83/55 |
| 4,436,133 | 3/1984 | Rohr | 301/65 X |
| 4,482,189 | 11/1984 | Samuelson et al. | 301/6 |
| 4,573,338 | 3/1986 | Daudi | 72/333 |
| 4,861,113 | 8/1989 | Imamura et al. | 301/65 |

FOREIGN PATENT DOCUMENTS

| | | |
|---|---|---|
| WO85/05328 | 12/1985 | Switzerland. |
| 1292167 | 10/1972 | United Kingdom. |
| 1438640 | 6/1976 | United Kingdom. |
| 1547363 | 6/1979 | United Kingdom. |
| 2208373 | 3/1989 | United Kingdom ............. 152/154.1 |

Primary Examiner—Russell D. Stormer
Attorney, Agent, or Firm—Fulwider, Patton, Lee & Utecht

[57] ABSTRACT

An automotive roadwheel of preselected rotational imbalance, the amount of imbalance being selected to coincide with the average amount of imbalance inherent in the tires to be mounted to the wheel and the orientation of the imbalance being readily discernable such as by coinciding with the location of the valve stem. The method of the invention calls for the heaviest orientation of the wheel to be aligned with the lightest orientation of the tire (or vice versa) during the mounting process to yield a balanced tire/wheel assembly without the need to add balancing weight in the majority of such assemblies.

21 Claims, 2 Drawing Sheets

WHEEL AND METHOD FOR CORRECTING ROTATIONAL IMBALANCE OF TIRES

This is a continuation of copending application Ser. No. 07/688,056 filed on Apr. 19, 1991 now abandoned.

BACKGROUND OF THE INVENTION

The present invention relates to automotive roadwheels and more particularly pertains to a wheel and method for achieving a rotationally balanced tire/wheel assembly.

Proper rotational balance of an automobile's tires is essential in order to provide a smooth ride, optimize handling characteristics, minimize wear and tear to the vehicle and extend the service life of the tires. A tire is normally balanced after its mounting to a wheel by the attachment of weight to the wheel. The balancing procedure typically comprises the steps of spinning the tire/wheel assembly up to speed, measuring forces generated by any imbalance, determining the amount of weight and the precise placement of such weight necessary to counteract the measured forces and crimping the required weight to the wheel's outer edges or adhesively securing the weights to the wheel. The assembly is then again spun up to speed to confirm that proper balance has been achieved. Occasionally, the entire balancing procedure must be repeated if a further readjustment is found to be necessary.

Repeating the above-described procedure for every tire of every vehicle manufactured in a modern high-speed automobile assembly line amounts to a significant effort. Any reduction in such an expense would of course be advantageous. Reducing the amount of weight necessary or obviating the need to actually add balancing weight to a significant portion of a manufacturing line's throughput would in fact constitute such an improvement.

Eliminating the balancing weights from a wheel provides the secondary benefit of enhancing the aesthetic appearance of the wheel as the lead weights normally crimped onto or adhered to the outboard side of the wheel are generally considered unsightly.

Although wheels can be produced to very exacting standards with respect to rotational balance, it is much more difficult if not impossible to manufacture a balanced tire. The complex internal structure of modern tires defies efforts to achieve an even weight distribution from the outset while the elastic nature of the tire makes it difficult to predict, let alone compensate for, the distortion and its commensurate effect on balance caused by the extremely high g-forces a tire is subjected to at highway speeds. Producing a finely balanced tire to be mounted to a finely balanced wheel in order to yield a balanced tire/wheel assembly is therefore not a viable approach towards minimizing the labor normally expended in balancing an automobile's tires. Tire manufacturers do however have the ability to dynamically test each tire for imbalance and mark the tire carcass to indicate the location of the highest or lowest concentration of weight.

An alternative approach is therefore called for that provides a rotationally balanced tire/wheel assembly which requires only a minimal amount of weight addition and in a significant number of incidents, obviates the need to add any extraneous balancing weights whatsoever.

SUMMARY OF THE INVENTION

The present invention provides a method which minimizes the need to add balancing weights to an automotive roadwheel upon the mounting of a tire thereto in order to achieve a satisfactory degree of rotational balance. Additionally, the present invention provides a wheel which readily facilitates the practice of such method.

The wheels of the present invention are manufactured with a preselected degree of rotational imbalance that substantially corresponds in magnitude to the average degree of imbalance inherent in the tires available for mounting thereto. The wheel is appropriately marked to indicate the location of its heaviest, or alternatively, its lightest angular orientation and the present method of the invention calls for a tire, previously tested and demarked to indicate its lightest, or alternatively, its heaviest angular orientation, to be mounted thereon such that wheel's heaviest angle corresponds with the tire's lightest angle. The net effect of this method is that most the resulting tire/wheel assemblies require less weight addition in order to satisfy the relevant balance specifications while a significant number of tire/wheel assemblies do not require the addition of any extraneous balancing weights thereto.

The preferred manner in which the preselected degree of imbalance is achieved in the wheel is by a reduction of weight from near its circumference in an unevenly distributed pattern. In a typical wheel configuration, material is readily removable or alternatively, withheld during the manufacturing process, from near the juncture of the wheel's rim element and its center element. This section typically includes much more material than is necessary to withstand the loads it is subjected to and therefore readily tolerates a reduction of mass therefrom. A cavity or cavities are formed to either extend into this section from the inner backside of the wheel or extend thereinto from the portion of the rim normally covered by a tire mounted thereto. The cavities take the form of an interrupted groove that extends about a portion of the wheel's circumference. By discontinuing the groove in the proximity of the wheel's valve stem hole, that portion of the wheel will remain heaviest and the location of the valve stem will automatically provide an indication of the location of the heaviest weight distribution. The cavity formed on the inner back side of the wheel can alternatively take the form of a single uninterrupted groove that extends about a portion of the wheel's circumference.

A tire marked by the tire manufacturer to indicate its lightest angular orientation is then mounted to the wheel such that the location of the tire manufacturer's mark coincides with the location of the valve stem. The tire/wheel assembly is then checked for rotational balance. In general, less weight will have to be attached to the tire/wheel assemblies to achieve the proper degree of balance while the attachment of additional balancing weights to an increased number of assemblies will be obviated altogether. This serves to reduce material costs, labor costs, expedites the assembly process, and may enhance the aesthetic appearance of the wheel.

Other features and advantages of the present invention will become apparent from the following detailed description, taken in conjunction with the accompanying drawings, which illustrate by way of example, the principles of the invention.

DETAILED DESCRIPTION OF THE INVENTION

FIGS. 1-5 generally illustrate automotive roadwheels according to the present invention. The various embodiments depicted illustrate the configuration and location of cavities disposed in a wheel that serve to impart a preselected degree of imbalance.

Figure 1:
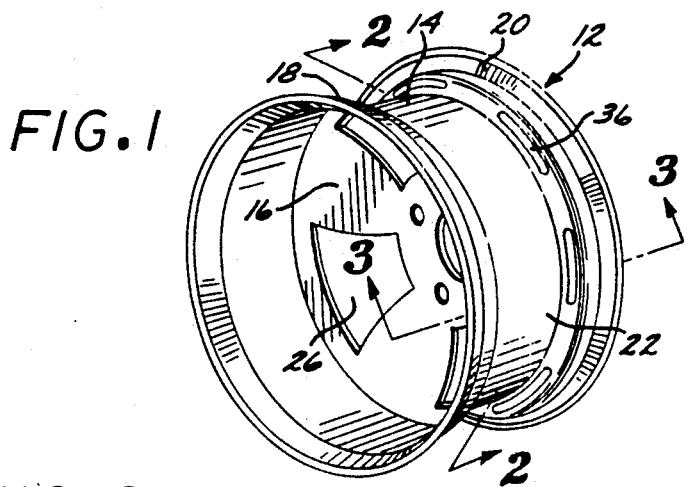
FIG. 1 is a perspective view of a roadwheel according to the present invention.

FIG. 1 is a perspective view of a wheel 12. The wheel generally consists of a rim element 14 and a center element 16. The rim element 14 generally defines a cylinder while its ends are formed to provide an inboard and outboard flanges 18, 20. The middle of the cylindrical rim element 14 has a "drop center" section 22 of reduced diameter. The entire rim element 14 is impermeable to air while valve stem hole 24 sets the interior of the cylinder in communication with its exterior.

The center element 16 of wheel 12 includes a centrally disposed hub section 26 that facilitates the mounting of wheel 12 to a vehicle's hub. The hub section 26 has a flat inboard mating surface 28, and is perforated by a central hub hole 32 and a plurality of lug holes 30. In the embodiment illustrated, a plurality of spokes 16 interconnect the hub section 26 with the rim element 14. Aesthetic considerations typically dictate the particular configuration of this part of the wheel and various spoke designs as well as flat solid disks, disks with various patterns of perforations therein and basket-weave type designs are common.

Figure 3:
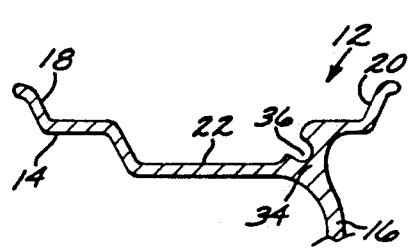
FIG. 3 is a cross-sectional view of the roadwheel taken along lines 3—3 of FIG. 1.

In a cast wheel, the juncture 34 between the wheel's rim element 14 and its center element 16 is of typically substantial cross-section as is apparent in FIG. 3. Although this section of the wheel is subjected to substantial compressive, tensile and shear loads, it has been found that many wheel designs nonetheless typically incorporate more material in this location than is necessary. Consequently, this area ideally lends itself to a selective reduction in mass in order to achieve the goals of the present invention.

Figure 2:
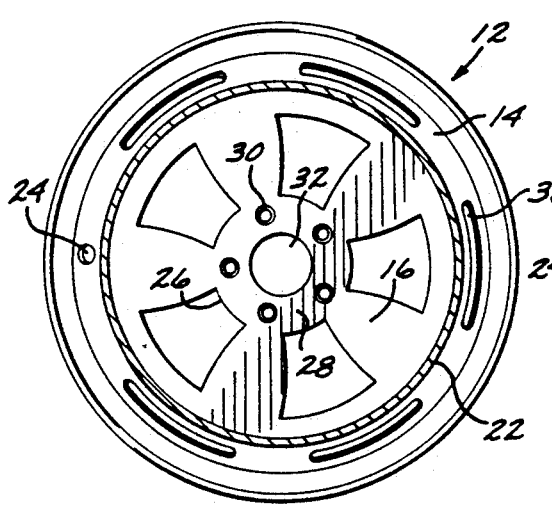
FIG. 2 is a cross-sectional view of the roadwheel taken along lines 2—2 of FIG. 1.
Figure 6:
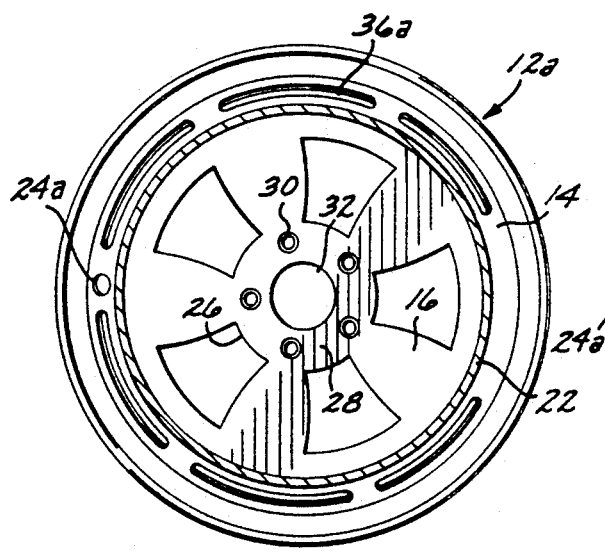
FIG. 6 is a cross-sectional view of an alternative embodiment of a roadwheel according to the present invention.
Figure 7:
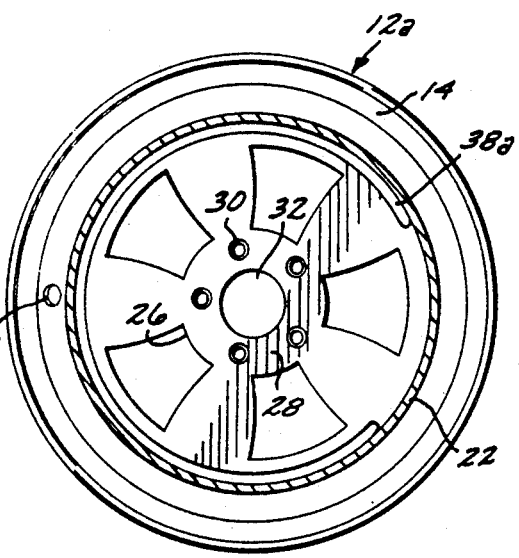
FIG. 7 is a cross-sectional view of another alternative embodiment of a roadwheel according to the present invention.

FIGS. 1-3 illustrate a preferred embodiment of the present invention in which a plurality of cavities 36 are formed within juncture element 34. The cavities 36 extend into juncture element 34 from that portion of rim element 14 that is normally within a tire mounted to wheel 12. The cavities 36 are distributed about the wheel so as to impart a preselected degree of imbalance to the wheel. An additional feature of the present invention calls for cavities 36 to be distributed about wheel 12 such that the heaviest portion of the wheel coincides with the location of the valve stem hole 24. Alternatively, the cavities 36a or cavity 38a are distributed about wheel 12a such that the lightest portion of the wheel coincides with the location of the valve stem hole 24a as shown in FIGS. 6 & 7. The areas between the cavities serves as ramps to allow a tire bead to freely move from the drop center section 22 up to its seat, adjacent flange 20, during the mounting process.

Figure 4:
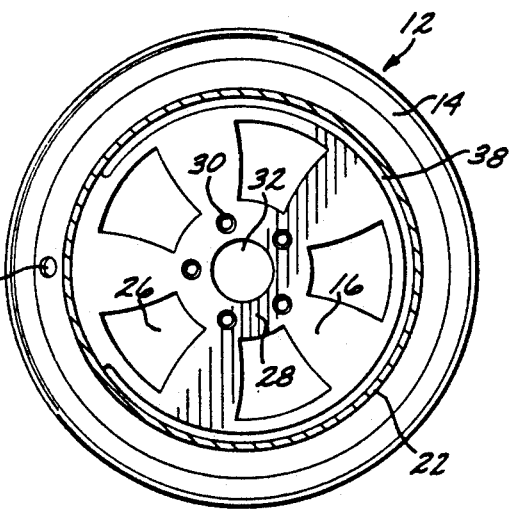
FIG. 4 is a cross-sectional view of an alternative embodiment of a roadwheel according to the present invention.
Figure 5:
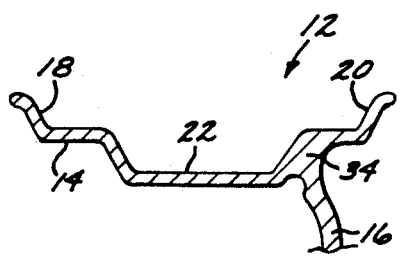
FIG. 5 is a further cross-sectional view of the roadwheel illustrated in FIG. 4.

FIGS. 4 and 5 illustrate an alternative embodiment of the present invention in which a single continuous grove 38 and extends about a major portion of wheel 12. This serves to provide a preselected degree of imbalance in the same manner provided by the embodiment illustrated in FIGS. 1-3. In a further alternative embodiment, a plurality of cavities similar to those illustrated in FIGS. 1-3 replace the continuous groove shown in FIGS. 4 and 5.

The preselected degree of imbalance imparted to the wheel of the present invention is selected to coincide with the average degree of imbalance of the tires that are to be mounted to the wheel. While the actual statistical distribution of tire imbalance is a function of tire type and size, and additionally varies from manufacturer to manufacturer, the average of such imbalance is easily determinable. Production of wheels according to the present invention can be tailored to a particular OEM supplier by considering the average imbalance of the particular tire type and size intended for mounting to such wheels. By way of example, if an average of 1 oz. of balancing weight would have to be attached to a perfectly balanced wheel in order to bring the average tire of a certain tire type mounted thereon into balance, then the length, width, depth, and distribution of cavities 36, 38, are selected so as to impart an inherent imbalance to the wheel that would require the attachment of 1 oz. weight to the wheel sans tire in order to bring such wheel sans tire into balance.

Cavities 36, 38 of the present invention can be formed by a variety of methods. In the case of a cast wheel, for example, appropriate protrusions can be formed in the molds into which the aluminum alloy is cast in order to form the cavities in the resulting wheel. Alternatively, cavities 36, 38 can be machined into a wheel after completion of its initial manufacturing process.

The method of the present invention calls for the mounting of a tire to a wheel, of the type described above, such that the heaviest angular orientation of the wheel coincides with the lightest angular orientation of the tire. The task of dynamically testing each tire, determining its weight distribution and marking the tire carcass accordingly is preferably performed by the tire manufacturer. A mark on the tire indicating its lightest orientation is then simply aligned with the wheel's valve stem which serves to indicate the wheel's heaviest orientation. Alternatively, marks can be employed to indicate the wheel's lightest orientation and the tire's heaviest orientation. Balance testing the resulting tire/wheel assembly will confirm that the majority of the assemblies will require the attachment of less balancing weight, while an increased number of the assemblies are within specifications and do not require the attachment of any additional weights.

While a particular form of the invention has been illustrated and described, it will also be apparent to those skilled in the art that various modifications can be made without departing from the spirit and scope of the invention. Accordingly, it is not intended that the invention be limited except as by the appended claims.

What is claimed is:

1. An automotive roadwheel-tire combination, comprising:
    a tire, selected from a group of tires having an average overall net imbalance, the overall net imbalance of each tire of said group of tires being the sum of all imbalances inherent therein and randomly distributed thereabout, each tire having a marking thereon so as to indicate the angular orientation of its imbalance;
    a wheel formed to have an inherent amount of rotational imbalance substantially equivalent in magnitude to said average overall net imbalance of said group of tires and wherein said wheel has a marking thereon to indicate the angular orientation of its inherent imbalance, said tire being rotationally oriented on said wheel in reliance on said marks such that the inherent imbalance of the wheel tends to cancel the overall net imbalance of said tire to result in a more balanced roadwheel-tire combination.

2. The roadwheel of claim 1 wherein said roadwheel has a valve stem hole and wherein said roadwheel is formed such that the angular orientation of said imbalance coincides with the location of said valve stem hole.

3. The roadwheel of claim 2 wherein said roadwheel has a heaviest angular orientation and said heaviest angular orientation coincides with the location of said valve stem hole.

4. The roadwheel of claim 2 wherein said roadwheel has a lightest angular orientation and said lightest angular orientation coincides with the location of said valve stem hole.

5. The roadwheel of claim 1 wherein said wheel includes a rim element and center element, wherein said rim element has an inner side circumferentially joined to said center element and wherein a juncture between said rim and center elements is formed to include a plurality of cavities therein unequally distributed about its circumference, whereby the unequal distribution of said cavities yields said selected rotational imbalance.

6. The roadwheel of claim 5 wherein said cavities formed in said juncture extend thereinto from the outer side of said rim element.

7. The roadwheel of claim 5 wherein said rim element has a valve stem hole and said cavities are distributed such that the wheel's heaviest angular orientation coincides with the location of said valve stem hole.

8. The roadwheel of claim 5 wherein said rim element has a valve stem hole and said cavities are distributed such that the wheel's lightest angular orientation coincides with the location of said valve stem hole.

9. The roadwheel of claim 5 wherein said cavities formed in said juncture extend thereinto from the inner side of said rim element.

10. The roadwheel of claim 9 wherein said rim element has a valve stem hole and said cavities are distributed so that the wheel's heaviest angular orientation coincides with the location of said valve stem hole.

11. The roadwheel of claim 9 wherein said rim element has a valve stem hole and said cavities are distributed so that the wheel's lightest angular orientation coincides with the location of said valve stem hole.

12. The roadwheel of claim 1 wherein said wheel includes a rim element and center element, wherein said rim element has an inner side circumferentially joined to said center element and wherein a juncture between said rim and center elements is formed to include a single cavity extending about a portion of its circumference whereby an imbalance is imparted to the wheel.

13. The roadwheel of claim 12 wherein said cavity formed in said juncture extends thereinto from the inner side of said rim element.

14. The roadwheel of claim 13 wherein said rim element has a valve stem hole and said cavity is oriented so that the wheel's heaviest angular orientation coincides with the location of said valve stem hole.

15. The roadwheel of claim 13 wherein said rim element has a valve stem hole and said cavity is oriented so that the wheel's lightest angular orientation coincides with the location of said valve stem hole.

16. A method of providing a balanced tire/wheel assembly comprising the steps of:
    determining an average overall net rotational imbalance inherent in a particular type of tire, the overall net imbalance of each tire being the sum of all imbalances inherent therein and randomly distributed thereabout;
    forming a roadwheel onto which said type of tire is to be mounted, said roadwheel being formed so as to have an amount of imbalance inherent therein substantially equal to the average overall net imbalance inherent in said type of tire;
    marking said wheel so that the angular orientation of said imbalance is readily discernable;
    marking each tire of said type of tire so that the angular orientation of its imbalance is readily discernable; and
    mounting each tire on said rim such that said imbalances tend to cancel.

17. The method of claim 16 including the step of forming the roadwheel such that the angular orientation of its imbalance coincides with the location of a valve stem hole formed therein.

18. The method of claim 17 including the step of forming the roadwheel such that its heaviest angular orientation coincides with the location of the valve stem hole.

19. The method of claim 18 including the step of marking the lightest angular orientation of each tire and aligning the tire's mark with the wheel's valve stem hole in the mounting step.

20. The method of claim 17 including the step of forming the roadwheel such that its lightest angular orientation coincides with the location of the valve stem hole.

21. The method of claim 20 including the step of marking the heaviest angular orientation of each tire and aligning the tire's mark with the wheel's valve stem hole in the mounting step.

* * * * *